United States Patent
Han et al.

(10) Patent No.: US 10,441,097 B2
(45) Date of Patent: Oct. 15, 2019

(54) SURFACE MARKING DEVICE AND METHOD OF USE THEREOF

(71) Applicants: Andrew Han, Irvine, CA (US); Yoojin Lee, Irvine, CA (US)

(72) Inventors: Andrew Han, Irvine, CA (US); Yoojin Lee, Irvine, CA (US)

( * ) Notice: Subject to any disclaimer, the term of this patent is extended or adjusted under 35 U.S.C. 154(b) by 199 days.

(21) Appl. No.: 15/836,792

(22) Filed: Dec. 8, 2017

(65) Prior Publication Data

US 2019/0174937 A1 Jun. 13, 2019

(51) Int. Cl.
*A47G 1/24* (2006.01)
*A47G 1/20* (2006.01)
*B25H 7/04* (2006.01)
*G01D 21/00* (2006.01)

(52) U.S. Cl.
CPC ............. *A47G 1/205* (2013.01); *B25H 7/045* (2013.01); *G01D 21/00* (2013.01)

(58) Field of Classification Search
CPC ...................................... A47G 1/205
USPC .................................. 33/613, 645
See application file for complete search history.

(56) References Cited

U.S. PATENT DOCUMENTS

| | | | |
|---|---|---|---|
| 3,530,591 A * | 9/1970 | Moffitt | A47G 1/20 33/613 |
| 4,382,337 A * | 5/1983 | Bendick | B25H 7/04 33/574 |
| 4,455,756 A * | 6/1984 | Greene | A47G 1/205 248/547 |
| 5,398,906 A | 3/1995 | Aydelott | |
| 6,032,378 A * | 3/2000 | Null | A47G 1/205 33/42 |
| 6,049,991 A | 4/2000 | Gruenberg | |
| 6,185,831 B1 * | 2/2001 | Pluciennik | A47G 1/205 33/613 |
| 6,574,880 B2 | 6/2003 | Lombardo | |
| 6,898,862 B1 * | 5/2005 | Oberst | A47G 1/205 33/574 |
| 7,155,840 B1 * | 1/2007 | Carbonaro | A47G 1/205 33/451 |
| 7,185,442 B2 | 3/2007 | Grillo | |
| 7,316,078 B2 | 1/2008 | Hagman | |
| 7,350,312 B1 | 4/2008 | Grillo | |
| 7,958,648 B1 | 6/2011 | MacConnell | |
| 8,424,217 B2 * | 4/2013 | Murray | G01C 9/02 33/347 |
| 9,392,890 B1 | 7/2016 | Royak | |
| 2004/0098875 A1 | 5/2004 | Gould | |
| 2006/0196069 A1 | 9/2006 | Groepper | |

(Continued)

*Primary Examiner* — George B Bennett
(74) *Attorney, Agent, or Firm* — Yoojin Lee (57) ABSTRACT

A device for marking a picture hanging spot on a mounting surface has a general U-shape encompassed by a support base, a front arm and a rear arm. The device is further provided with at least one bore, at least one pressing rod adjustably engaging within the bore, a plurality of padding means inward the U-shape, and a marking means on the rear arm facing the mounting surface. Therein, the pressing rod and the marking means are coaxially aligned, and the axis thereof is substantially perpendicular to the picture hanging spot on the mounting surface. Thereby, the pressure exerted on the pressing rod transfers through the axis thereof to the marking means that leaves a mark on the mounting surface.

20 Claims, 6 Drawing Sheets

(56) References Cited

U.S. PATENT DOCUMENTS

| | | | |
|---|---|---|---|
| 2006/0231721 A1 | 10/2006 | Robic | |
| 2009/0313843 A1* | 12/2009 | Compton | A47G 1/205 33/613 |
| 2010/0116964 A1* | 5/2010 | Aleo | A47G 1/202 248/476 |
| 2011/0174953 A1 | 7/2011 | Ruiz | |
| 2015/0342375 A1* | 12/2015 | Weber | A47G 1/205 29/428 |
| 2016/0278548 A1* | 9/2016 | Jackson | A47G 1/1606 |
| 2017/0002974 A1* | 1/2017 | Will | A47G 1/16 |
| 2018/0084930 A1* | 3/2018 | Bornstein | A47G 1/205 |
| 2019/0032843 A1* | 1/2019 | Burton | F16M 13/02 |
| 2019/0070877 A1* | 3/2019 | Flores | B41K 1/003 |

\* cited by examiner

SURFACE MARKING DEVICE AND METHOD OF USE THEREOF

FIELD OF THE INVENTION

The present invention relates in general to a device for marking a spot on a surface, more particularly, for marking a picture hanging spot for installing a hanger on a mounting wall and includes the method therefor.

BACKGROUND

Mounting a hanging object (e.g., a picture frame, an art work, a mirror and the like; herein, the hanging object and the picture frame are interchangeable) on a surface (e.g., a mounting surface, a mounting wall, a wall and the like; herein, the surface and the wall are interchangeable) can be a challenge. Positioning the picture frame at a desired location can be done at sight. However, locating an exact hanging spot on the wall where to install a hanger (e.g., a nail, a screw, a hook or other anchoring securement; herein, a hanger and an anchor are interchangeable) that receives the picture frame is a daunting task. Furthermore, locating an exact anchor spot may require many trials of guesswork due to the sight obstruction of the picture frame, which is not only time consuming but also prone to have errors.

Typically, the picture frame includes an anchor hole or picture hanging hardware (e.g., a hook, a sawtooth hanger, a D-ring, a wire, etc.) However, as the most anchor holes or picture hanging hardware (herein, an anchor hole and the picture hanging hardware are interchangeable) are located on the back of the picture frame, they hinder view of an installer trying to locate where to install the hanger on the wall. There are many methods to assist the installer to locate where to fasten a hanger on the wall, such that the anchor hole on the back of the picture frame can properly engage with the hanger fastened on the wall.

There are several attempts proposing wall marking system for hanging a picture frame on the wall. According to U.S. Pat. Nos. 7,350,312 and 7,185,442 to Grillo; U.S. Pat. Pub. No. 20110174953 to Ruiz; U.S. Pat. Pub. No. 20040098875 to Gould; U.S. Pat. No. 9,578,980 to Freeman; and U.S. Pat. No. 6,574,880 to Lombardo, devices depend on adhesiveness technology. Hence, their uses are limited to a certain type of surfaces that devices can be applied against. In addition, the back of hanging objects such as mirrors or other frames often have recessed anchor holes with the frame edges raised. In that case, even if the wall surface is conditioned to accept the adhesive side, the devices may not adhere to the back of the hanging object. Further, due to their dependency on adhesiveness, the devices are for single use, not reusable.

According to U.S. Pat. Pub. No. 20060231721 to Robic and U.S. Pat. No. 5,398,906 to Aydelott, the marking devices assist picture frames that are equipped with certain types of hanging hardware on the back of the picture frames, such as saw-tooth types or wire types. Plus, the devices are designed to mark only one anchor spot per use.

Furthermore, according to U.S. Pat. No. 7,958,648 to MacConnell and U.S. Pat. Pub. No. 20060196069 to Groepper, marking means involve dispensation of ink mark on the wall. However, depending on types of wall surfaces, the ink may not leave a mark on the wall. Even if the wall receives the ink mark, the ink may smear or streak so the marking may be unclear to locate an exact spot for nailing the wall.

Furthermore, according to U.S. Pat. No. 9,392,890 to Royak, the device is a combination of a picture hanger and a wall marker. The device remains between the hanging object and the wall after application, instead of being removed. Thus, there may be an aesthetic issue as the picture frame may look spaced out from the wall. Plus, the device is for single use, not reusable.

Other relevant patents or patent publications include U.S. Pat. No. 604,991 to Gruenberg; U.S. Pat. No. 6,971,184 to Prevost; and U.S. Pat. No. 7,316,078 to Hagman. However, they do not offer a universal solution to aforementioned issues.

Therefore, there exists a need for a device that marks an anchor spot on the wall to hang a picture frame yet that overcomes drawbacks listed above and is easy and simple to use and manufacture. New type of an anchor spot marking device is being developed to meet those demands.

SUMMARY

For improving issues aforementioned, the present invention (herein, the present invention and the device are interchangeable) discloses a device for marking a picture hanging spot on a mounting surface. The present invention comprises: a support base having front and rear ends that are spaced apart; a front arm angularly extending from the front end; and a rear arm angularly extending from the rear end and in parallel with the front arm, wherein the support base, the front arm, and the rear arm integrally form a general U-shape therebetween for receiving a picture frame inside the U-shape.

The device is further provided with at least one bore disposed generally away from the support base; at least one pressing rod adjustably engaging within the bore; a plurality of padding means disposed inside the U-shape; and a marking means disposed on the rear arm facing the mounting surface, wherein the pressing rod coaxially aligns with the marking means corresponding to the desired location. With such configuration, the device is allowed to secure the hanging object inside the U-shape via adjusting the pressing rod toward or away from the picture frame, and the marking means locate where a hanger to be anchored on the wall as the device is pushed against the wall.

Furthermore, the device is provided with marking means having a generally tapered end to exert pressure effectively at the desired location on the wall. The device is further provided with padding means generally inward the U-shape to prevent damage to the hanging object as the pressing rod is adjusted to secure the hanging object.

Therefore, the device can accommodate various sizes of the hanging object and various types of picture hanging hardware (e.g., a hook, a sawtooth hanger, a D-ring, a wire, etc.) or anchor holes. Multiple units of the device can be applied for the hanging object that has multiple picture hanging hardware or anchor holes. That is, the multiple hanging spots can be marked effectively in one application. Further, the device is removed after use, therefore reusable.

These and other embodiments are described further below with reference to the figures.

BRIEF DESCRIPTION OF THE DRAWINGS

To facilitate understanding, the same reference numerals have been used, where possible, to designate common components presented in the figures. The drawings are depicted schematically and not to scale. Various embodiments can readily be understood by considering the following detailed description in conjunction with the accompanying drawings.

DETAILED DESCRIPTION

A detailed description of various embodiments is provided below along with accompanying figures. The detailed description is provided in conjunction with such embodiments, but is not limited to such examples. It is envisioned that a person skilled in the art will appreciate other possible configurations of the present invention, and that any such work around will fall under the scope of the present invention.

Referring to FIG. 1 to FIG. 6, the present invention describes a device 100/200/300 for marking an anchor spot where a hanger to be fastened on a mounting surface 190 in order to mount a hanging object 180 on the wall 190.

The marking device 100/200/300 has a generally U-shaped body 116 that is comprised of a support base 110 having a front end 112 and a rear end 114 that are spaced apart; a front arm 120 angularly extending from the front end 112; and a rear arm 130 angularly extending from the rear end 114 yet in parallel with the front arm 120. That is, the general U-shape 116 can receive a hanging object 180 inside the U-shape 116. At least one bore 150 is disposed generally away from the support base 110. At least one pressing rod 160 (herein, the pressing rod 160 includes 160A and/or 160B) movable within the bore 150 exerts an adjustable gripping force on the hanging object 180 placed inside the U-shape 116, such that the hanging object 180 can be secured between the front arm 120 and the rear arm 130. A plurality of padding means 140 are disposed inside the U-shape 116 and/or the back side 134 of the rear arm 130 so that prevents damage to the hanging object 180 and/or the wall 190 when the device 100/200/300 is pushed against the wall 190. A marking means 170 is disposed on the back side 134 of the rear arm 130 facing the mounting surface 190 as the marking means 170 has a direct contact with the mounting surface 190 in use.

Therein, during application, the pressing rod 160 is coaxially aligned with the anchor hole 182 so as to secure the hanging object 180, and the pressing rod 160 is coaxially aligned with the marking means 170 as well so as to transfer pressure through the pressing rod 160 to the marking means 170 that eventually marks the anchor spot on the wall 190. In the other words, the pressing rod 160, the anchor hole 182, and the marking means 170 are in line sharing the same axis 192, and the axis 192 thereof perpendicularly corresponds to the desire location on the mounting surface 190.

The device 100/200/300 may further comprises an internal thread (i.e., a female thread) 152 inside the bore 150 and an external thread (i.e., a male thread) 164 on the pressing rod 160 that screwably engages and turns within the bore 150. Thereby, the griping force that holds the hanging object 180 can be adjusted via rotation of the pressing rod 160. In use, the pressing rod 160 may turn in one direction to increase the gripping force and secure the hanging object 180. After use, the pressing rod 160 may turn in the opposite direction to loosen the gripping force and disengage the hanging object 180 from the device 100/200/300. The pressing rod 160 may further include a stopping means 162 at least one end of the pressing rod 160 for inhibiting the pressing rod 160 from disengaging from the bore 150.

Figure 1:
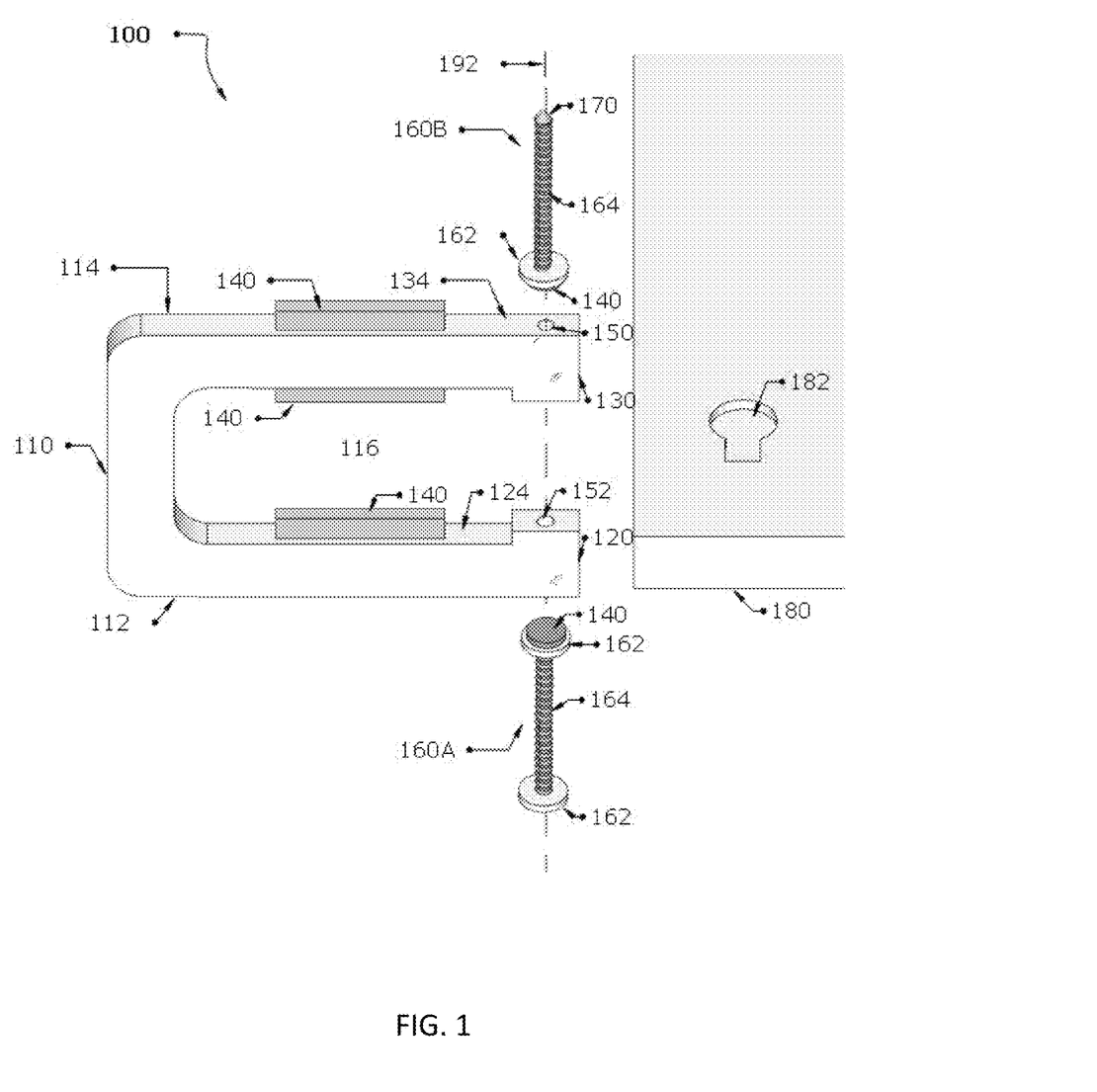
FIG. 1 illustrates an exploded representation of the device, in accordance with an embodiment having bores and pressing rods disposed on both front and rear arms and marking means disposed on the pressing rod on the rear arm.
Figure 3:
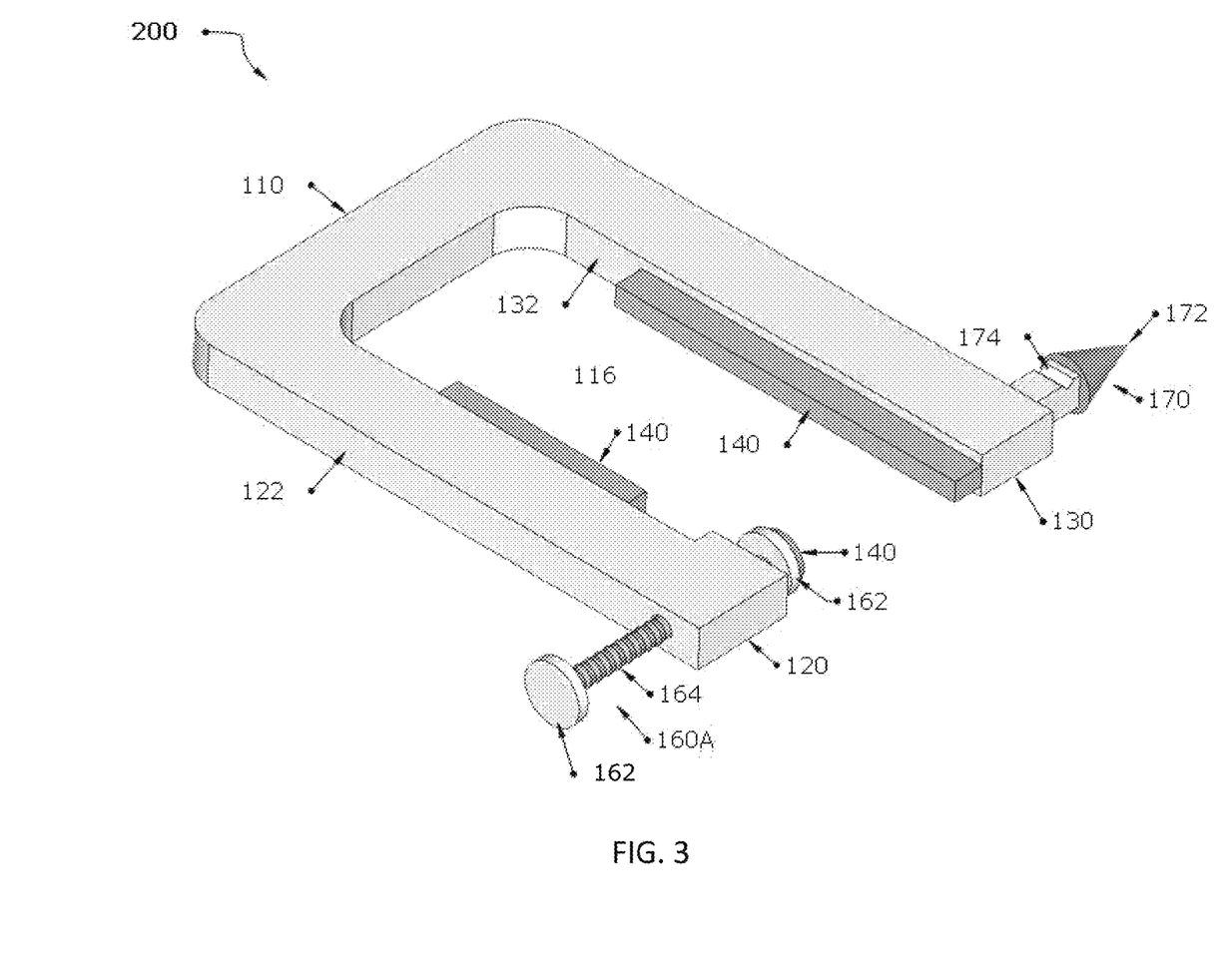
FIG. 3 illustrates a schematic representation of the device, in accordance with another embodiment having a pressing rod and a bore disposed on a front arm and marking means disposed on a rear arm.

FIG. 1 illustrates an exploded view of one embodiment, the device 100. The device 100 includes bores 150, a pressing rod 160A disposed on the front arm 120, a pressing rod 160B disposed on the rear arm 130, and padding means inside the U-shape 116 and on the back side 134. The front arm 120 in FIG. 1 is provided with a bore 150 having an internal thread 152, a pressing rod 160A having an external thread 164, and padding means 140 disposed on the front side 124. Further, the pressing rod 160A is provided with stopping means 162 disposed on both ends of the pressing rod 160A and padding means 140 disposed on an end of the pressing rod 160A inward the U-shape 116. The rear arm 130 in FIG. 1 is provided with a bore 150 having an internal thread 152, a pressing rod 160B having an external thread 164, and a padding means 140 disposed on the front side 132 (the front side 132 of the rear arm 130 is shown in FIG. 3) and the back side 134. Further, the pressing rod 160B is provided with a stopping means 162 disposed on an end of the pressing rod 160B inward the U-shape 116, a marking means 170 disposed on the opposite end of the pressing rod 160B, and a padding means 140 disposed on the stopping means 162. In FIG. 1, bores 150 and pressing rods 160, and the marking means 170 share the same axis 192, and the axis 192 thereof is perpendicular to the wall 190. Further, the marking means 170 in FIG. 1 is provided with a generally tapered end 172.

Figure 2:
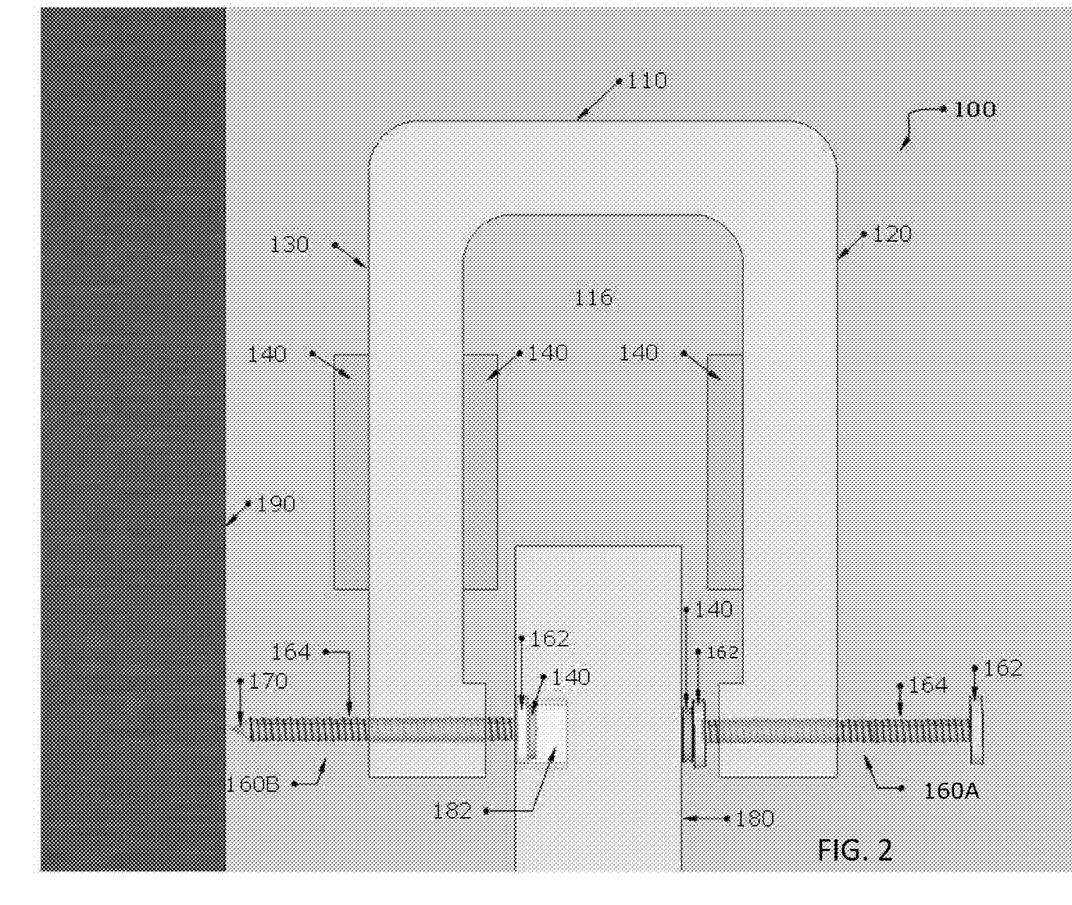
FIG. 2 illustrates a schematic representation of how the device of FIG. 1, an anchor hole at the back of picture frame and a wall are aligned during application.

FIG. 2 shows when the hanging object 180 is secured and aligned with the device 100 in FIG. 1 during application. Referring to FIG. 2, in use of the device 100, a peripheral edge of the hanging object 180 near an anchor hole 182 is placed between the front arm 120 and the rear arm 130. Further, the padding means 140 of the pressing rod 160B is in contact with the anchor hole 182, and the padding means 140 of the pressing rod 160A is in contact with the front of the hanging object 180 yet in line with the anchor hole 182. Then, the pressing rods 160 are adjusted via rotation to secure the hanging object 180 therebetween. Thereby, before applying pressure to mark the anchor spot on the wall 180, pressing rods 160 that secure the hanging object 180, the anchor hole 182, and the marking means 170 are coaxially aligned, and the axis 192 (Refer to FIG. 1) thereof is substantially perpendicular with respect to the desire location of the wall 190. Then, such alignment in FIG. 2 can be pushed against the wall 190 and leave a perceivable mark (i.e., the anchor spot) to the wall 190.

In another embodiment of the invention referring to FIG. 3, the device 200 comprises a bore 150 and a pressing rod 160A disposed on the front arm 120, a marking mean 170 disposed on the rear arm 130, and padding means disposed inside the U-shape 116. The front arm 120 in FIG. 2 is provided with a bore 150 having an internal thread 152, a pressing rod 160A having an external thread 164, stopping means 162 disposed on both ends of the pressing rod 160A, and padding means 140 disposed on the back side 124 and an end of the pressing rod 160A inward the U-shape 116.

The rear arm 130 in FIG. 2 is provided with the marking means 170 disposed on the back side 134, and the padding means 140 generally disposed on the front side 132 and in line with the marking means 170, thereby the padding means 140 on the front side 132, the marking means 170 and the pressing rod 160A are coaxially aligned. Further, the marking means 170 in FIG. 3 is provided with a generally tapered end 172 and a groove 174 that is disposed adjacent and parallel to the back side 134.

Figure 4:
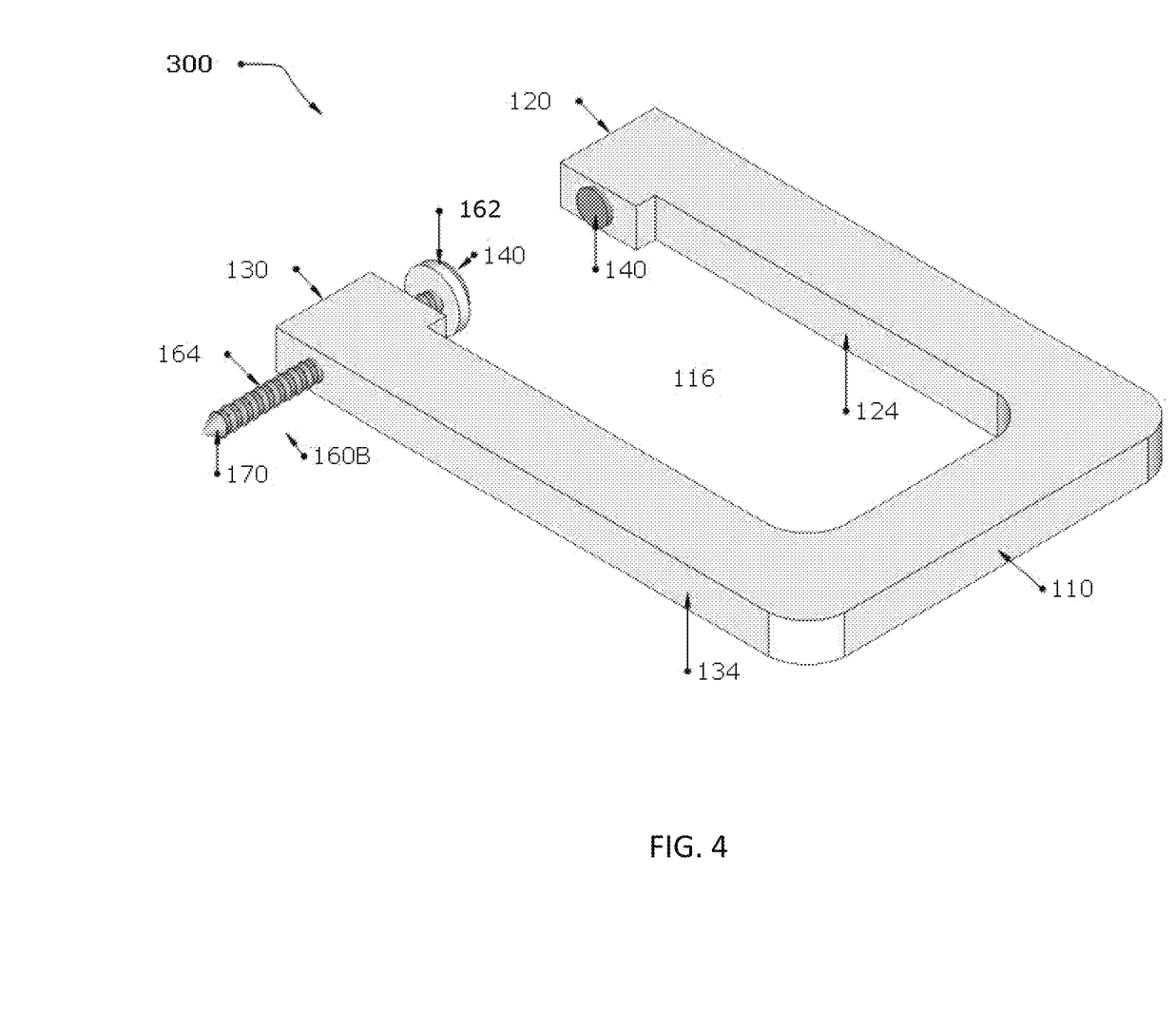
FIG. 4 illustrates a schematic representation of the device, in accordance with yet another embodiment having a pressing rod, a marking means, and a bore disposed on a rear arm.

In yet another embodiment of the invention referring to FIG. 4, the device 300 comprises a padding means 140 disposed on the front arm 120, and a bore 150 and a pressing rod 160B disposed on the rear arm. The front arm 120 in FIG. 4 is provided with padding means 140 disposed inward the U-shape 116 and in line with the marking means 170. The rear arm 130 in FIG. 4 provided with a bore 150 having an internal thread 152 and a pressing rod 160B having an external thread 164. Further, the pressing rod 160B is provided with a stopping means 162 disposed on an end of the pressing rod 160B inward the U-shape 116, a padding means 140 disposed on the stopping means 162, and a marking means 170 disposed on the other end of the pressing rod 160B facing the wall 190. In FIG. 4, the bore 150 and the pressing rod 160B, and the marking means 170 are coaxially aligned.

Figure 5:
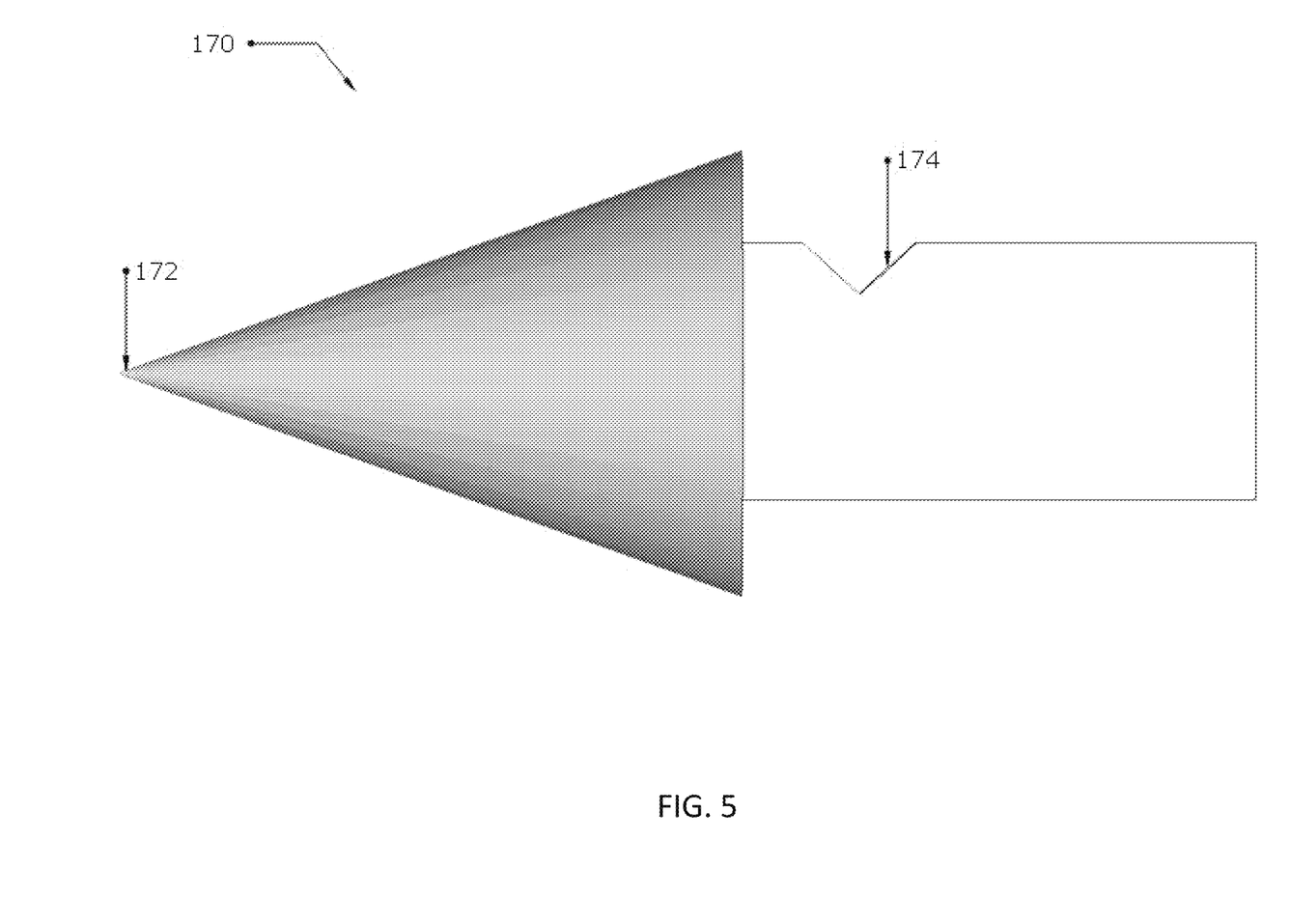
FIG. 5 illustrates a schematic representation of the marking means of FIG. 3.

Referring to FIG. 5, the marking means 170 comprises a tapered end 172 for transferring pressure effectively at the desired location on the wall 180 as the device 100/200/300 is pushed against the wall 190. The marking means 170, also as shown in FIG. 3, may further comprise a groove 174 adjacent and parallel to the back side 134 of the rear arm 130 for supporting a wire type (i.e., cord type) hanger on the back of the hanging object 180. The marking means 170 may comprise metal, plastic or the like that is hard enough to leave a dent mark on the wall 190. The marking means 170 may comprise ink or dye pad, graphite, or the like pigmented type marking material to leave a pigmented mark on the wall 190. Furthermore, the marking means 170 may comprise any combinations thereof for leaving a perceivable mark on the wall 190.

Referring to FIGS. 1, 2, 3, and 4, the stopping means 162 may have a plate shape having a diameter greater than the diameter of the bore 150 to inhibit the pressing rod 160 from falling out from the bore 150. The stopping means 162 may be coupled to the padding means 140.

Referring to FIGS. 1 and 2, the padding means 140 is disposed inward the U-shape 116 to prevent damage to the hanging object 180 placed inside U-shape 116. Referring to FIG. 1, the padding means 140 may be further disposed on the back side 134 of the rear arm 130 to prevent damage to the wall 190 while pressure is applied to the device 100. The padding means 140 may comprise deformable material (i.e., silicon, elastomer, form or the like) to absorb and dissipate the pressure stress exerted on the device 100/200/300 other than the marking means 170. The surface of padding means 140 may be textured and/or coated to provide high friction for effective gripping of the hanging object 180.

Figure 6:
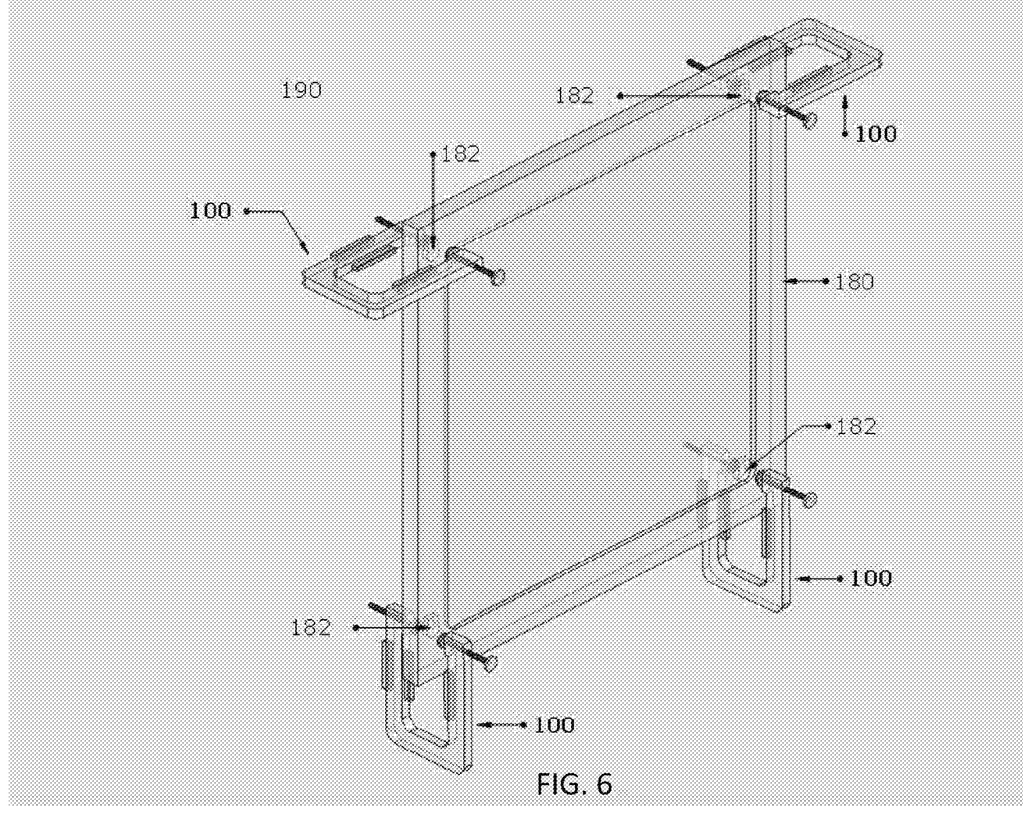
FIG. 6 illustrates a schematic representation of an environmental view when multiple units of the device are in use.

FIG. 6 shows an environmental view from the back of the hanging object 180, for example, when applying a plurality of the device 100 to the hanging object 180 that has four anchor holes 182. Depending on the proximity of the anchor hole 182 to the edges of the hanging object 180, the device 100 can be applied from sides, top and/or bottom of the hanging object 180.

The method of using the device 100/200/300 may be achieved by performing the following steps: (a) placing the device 100/200/300 around a peripheral edge of the hanging object 180 yet near the anchor hole 182, wherein front and back of the hanging object 180 respectively engage with front and rear arms 120 and 130, while the anchor hole 182, the marking means 170, and the pressing rod 160 are coaxially aligned, and the axis 192 thereof is substantially perpendicular to the desired location of the wall 190; (b) adjusting the pressing rod 160 in line with the marking means to hold the hanging object; (c) repeating previous steps, (a) and (b) for multiple anchor holes 182; (d) positioning the hanging object 180 at the desired location where the hanging object 180 to be hung on the wall 190; (e) applying pressure on each front arm 120 yet against the mounting surface 190 so that each marking means 170 marks the wall 190 at each desired location; (f) removing the hanging object 180 from the wall 190; (g) mounting a hanger into the wall 190 at each desired location as marked by each marking means 170; and (h) removing each device 100/200/300 from said hanging object 180.

Although the foregoing examples describe some details of the present invention for purposes of clarity of understanding, the invention is not limited to the details provided. There are many alternative ways of implementing the invention. The disclosed examples are illustrative and not restrictive. Therefore, a numerous modifications or changes can be made to the invention but still within the scope of the invention as set forth in the claims.

As an alternative way, the pressing rod 160 may have adjustable tension rod mechanism, instead of screwable threads 152 and 164. Or the device 100/200/300 may have extra pressing rods 160A and bores 150 that are not in line with the marking means 170, such that the extra pressing rods 160A assist securing the hanging object 180 between the front and rear arm 120 and 130, while the other pressing rod 160 in line with the marking means 170 transfers pressure to the marking means 170. For another example, front and rear arms 120 and 130 may be extendable to accommodate the anchor hole 182 located further away from the edges of the hanging object 180. Likewise, the support base 110 may be extendable to accommodate a thicker hanging object 180 than usual. Also, a bubble level can be disposed either front or rear arms 120 and 130 for checking a level as the hanging object 180 is positioned on the wall 190. Further, in addition to mark a picture hanging spot on the wall, the invention may be practiced for a general purpose of marking a desired spot that is obscured by the object, such as constructional or crafting purposes.

We claim:

1. A device for marking a desired location of a hanging object on a mounting surface comprising:
    (a) a support base provided with front and rear ends that are spaced apart;
    (b) a front arm angularly extending from said front end;
    (c) a rear arm angularly extending from said rear end and in parallel with said front arm;
    (d) wherein said support base, said front arm, and said rear arm integrally form a general U-shape therebetween for receiving said hanging object inside said U-shape;
    (e) at least one bore disposed away from said support base;
    (f) at least one pressing rod adjustably engaging within said bore such that said pressing rod is movable toward or away from said hanging object;
    (g) a plurality of padding means disposed inside said U-shape; and
    (h) a marking means disposed on said rear arm facing said mounting surface;

(i) wherein said pressing rod coaxially aligns with said marking means corresponding to said desired location, whereby said marking means exert pressure at said desired location to mark said mounting surface in response that said device is pushed against said mounting surface.

2. The device of claim 1, wherein said device further comprises:
(a) said bore provided with an internal thread; and
(b) said pressing rod provided with an external thread to be screwably movable within said bore for gripping said hanging object inside said U-shape via rotation of said pressing rod and a stopping means coupled with at least one end of said pressing rod for preventing said pressing rod from disengaging from said bore.

3. The device of claim 2, wherein said marking means is provided with a tapered end for effective transfer of said pressure to said desired location.

4. The device of claim 3, wherein said marking means comprises hard material (e.g., metal or plastic), pigmented material (e.g., ink, dye, or graphite), or any combination of thereof for leaving a perceivable mark on said mounting surface.

5. The device of claim 4, wherein said marking means is replaceable.

6. The device of claim 3, wherein said marking means is provided with a groove adjacent and parallel to said rear arm for supporting a wire type hanger located on the back of said hanging object.

7. The device of claim 3, wherein said padding means comprises deformable yet high friction surfaced material (e.g., rubber, silicon or textured form) for gripping said hanging object effectively without damaging said hanging object.

8. The device of claim 7, wherein said stopping means is provided with a generally round plate having a diameter greater than the diameter of said bore and interposed between an end of said pressing rod and said padding means or said marking means.

9. The device of claim 8, wherein said front arm is provided with said bore, said pressing rod, said stopping means disposed on both ends of said pressing rod, and said padding means disposed on said stopping means inward said U-shape, wherein said pressing rod is coaxially aligned with said marking means, and the axis thereof is substantially perpendicular to said mounting surface.

10. The device of claim 9, wherein said rear arm is provided with said bore, said pressing rod, said marking means disposed on one end of said pressing rod facing said mounting surface, and said padding means disposed on the opposite end of said pressing rod, wherein both said pressing rods on said front and rear arms and said marking means are coaxially aligned.

11. The device of claim 9, wherein said rear arm is provided with said padding means inside said U-shape and in line with said marking means, whereby said padding means, said marking means and said pressing rod are coaxially aligned.

12. The device of claim 8, wherein said front arm is provided with said padding means inside said U-shape and in line with said marking means.

13. The device of claim 12, wherein said rear arm is provided with said bore, said pressing rod, said marking means disposed on one end of said pressing rod facing said mounting surface, and said padding means disposed on the opposite end of said pressing rod, wherein said pressing rod, said marking means, and said padding means are coaxially aligned.

14. A method of marking a desired location of a hanging object on a mounting surface using a marking device comprising:
(a) providing at least one said device, each said device comprising:
a support base provided with front and rear ends that are spaced apart;
a front arm angularly extending from said front end;
a rear arm angularly extending from said rear end and in parallel with said front arm, wherein said support base, said front arm, and said rear arm integrally form a general U-shape therebetween for receiving said hanging object inside said U-shape;
at least one bore disposed away from said support base;
at least one pressing rod adjustably engaging within said bore such that said pressing rod is movable toward or away from said hanging object;
a plurality of padding means disposed inside said U-shape; and
a marking means disposed on said rear arm facing said mounting surface, wherein said pressing rod coaxially aligns with said marking means corresponding to said desired location, whereby said marking means exert pressure at said desired location to mark said mounting surface in response that said device is pushed against said mounting surface,
(b) placing said device around a peripheral edge of said hanging object yet near picture hanging hardware, wherein front and back of said hanging object engage with said front and rear arms, respectively, while said picture hanging hardware, said pressing rod, and said marking means are coaxially aligned, and the axis thereof is substantially perpendicular to said desired location of said mounting surface,
(c) adjusting said pressing rod to hold said hanging object,
(d) repeating steps (a) and (c) for multiple said picture hanging,
(e) positioning said hanging object at said desired location where said hanging object to be hung,
(f) applying pressure on each said front arm yet against said mounting surface, thereby each said marking means marks each said desired location on said mounting surface,
(g) removing said hanging object from said mounting surface,
(h) mounting a hanger into said mounting surface at each said desired location as marked by each said marking means, and
(i) removing each said device from said hanging object.

15. The method of claim 14, wherein said bore(s) and said pressing rod(s) are screwably engaged, and said pressing rod(s) is movable within said bore(s) for gripping said hanging object inside said U-shape via rotation of said pressing rod(s).

16. The method of claim 15, wherein said marking means is provided with a tapered end for effective transfer of said pressure to said desired location.

17. The method of claim 15, wherein said padding means comprises deformable yet high friction surfaced material, and wherein said stopping means comprises a round plate having a diameter greater than the diameter of said bore.

18. The method of claim 17, wherein said front arm is provided with said bore, said pressing rod, said stopping means disposed on both ends of said pressing rod, and said padding means disposed on said stopping means facing inward said U-shape, wherein said rear arm is provided with said bore, said pressing rod, said marking means disposed on one end of said pressing rod facing said mounting surface, and said padding means disposed on the opposite end of said pressing rod, and wherein said pressing rods on said front and rear arms and said marking means are coaxially aligned and the axis thereof is substantially perpendicular to said mounting wall.

19. The method of claim 17, wherein said front arm is provided with said bore, said pressing rod, said stopping means disposed on both ends of said pressing rod, and said padding means disposed on said stopping means facing inward said U-shape, wherein said rear arm is provided with said padding means inside said U-shape and in line with said marking means, and wherein said marking means and said pressing rod are coaxially aligned and the axis thereof is substantially perpendicular to said mounting surface.

20. The method of claim 17, wherein said front arm is provided with said padding means inside said U-shape and in line with said marking means, wherein said rear arm is provided with said bore, said pressing rod, said marking means disposed on one end of said pressing rod facing said mounting surface, and said padding means disposed on the opposite end of said pressing rod, and wherein said pressing rod and said padding means are coaxially aligned and the axis thereof is substantially perpendicular to said mounting surface.

* * * * *